United States Patent [19]

Torigoe

[11] 4,248,329
[45] Feb. 3, 1981

[54] DISC BRAKES HAVING AN IMPROVED DUST-PROOFING STRUCTURE
[75] Inventor: Masahiko Torigoe, Itami, Japan
[73] Assignee: Sumitomo Electric Industries, Ltd., Japan
[21] Appl. No.: 33,409
[22] Filed: Apr. 26, 1979
[30] Foreign Application Priority Data
  May 23, 1978 [JP] Japan .................................. 53-61881
[51] Int. Cl.³ ........................ F16D 65/00; F16J 15/52
[52] U.S. Cl. ............................... 188/264 G; 74/18.2; 92/168; 188/72.4
[58] Field of Search ........................ 74/18.2; 92/168; 188/72.4, 1 R, 218 A, 264 G

[56] References Cited
U.S. PATENT DOCUMENTS
2,197,583  4/1940  Koeppen et al. ............ 188/218 A X
3,998,466  12/1976  Kondo .................................. 74/18.2

Primary Examiner—Duane A. Reger
Attorney, Agent, or Firm—Wenderoth, Lind & Ponack

[57] ABSTRACT

An improved disc brake having a dust boot for excluding dust from the cylinder bore. A thermo-insulating member is arranged in the heat conduction path leading from the rotor to the dust boot to protect it from deterioration due to heat.

6 Claims, 8 Drawing Figures

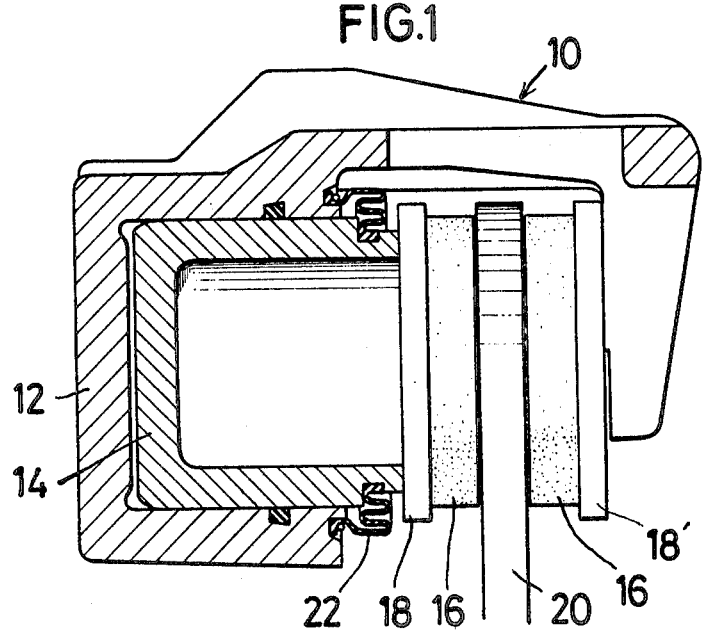
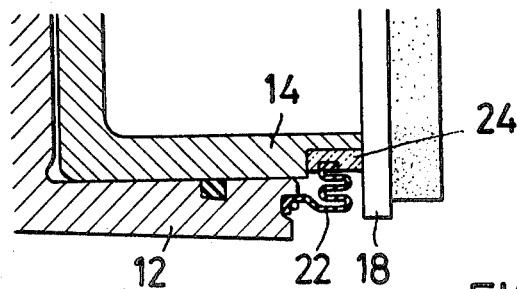
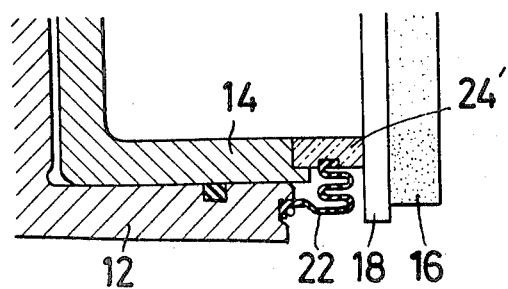

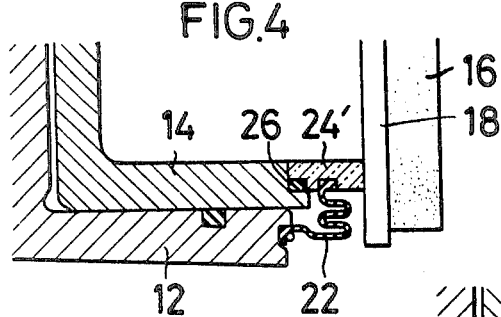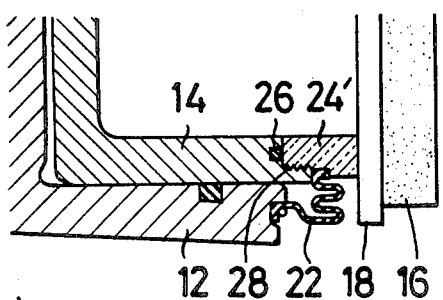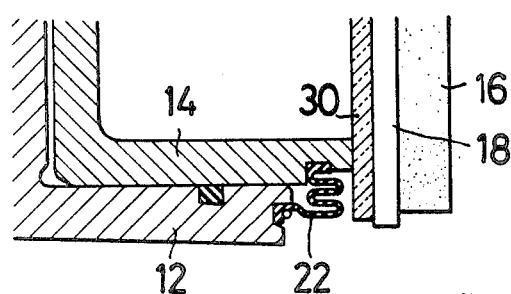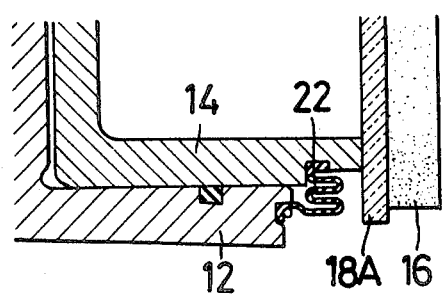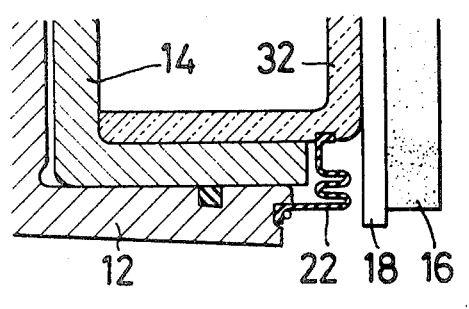

DISC BRAKES HAVING AN IMPROVED DUST-PROOFING STRUCTURE

The present invention relates to an improved disc brake, and more particularly to a disc brake having an improved dust-proofing structure.

The conventional disc brake had dust guard means comprising a dust boot for keeping out dust from the cylinder bore within which a piston for pushing a brake pad against one surface of the rotor to be braked slidably mounted. However, such a conventional disc brake had a disadvantage that the dust boot was liable to deterioration due to heat conducted from the rotor through other parts as will be described later in more detail.

An object of the present invention is to provide an improved disc brake which obviates such a disadvantage.

According to the present invention, there is provided a disc brake comprising a dust guard means which is protected from deterioration due to heat by means of a thermo-insulating member arranged in the heat conduction path leading from the rotor to the dust guard means.

Other features and advantages of this invention will become apparent from the following description taken with reference to the accompanying drawings, in which:

FIG. 1 is a vertical sectional view of a prior art disc brake having a dust boot;

FIG. 2 is a partial vertical sectional view of the first embodiment of this invention;

FIG. 3 to 5 are similar views of several variations of the second embodiment;

FIG. 6 is a similar view of the third embodiment;

FIG. 7 is a similar view of the fourth embodiment; and

FIG. 8 is a similar view of the fifth embodiment.

Throughout the drawings, like reference numerals and employed to designate like or corresponding parts.

Referring first to FIG. 1 showing the prior art floating caliper type disc brake by way of example, it comprises a caliper generally designated by the reference numeral 10, said caliper having two arms, one of which defines a cylinder 12 in which a piston 14 is slidably mounted. The cylinder bore is adapted to be pressurized from a master cylinder (not shown). The application of fluid pressure causes the piston 14 to push a brake pad 16 against one surface of a rotor 20 to be braked. The brake pad 16 is secured to a backing plate 18. Upon the pressurization, the caliper 10 is slid by reactive force in such a direction that a brake pad 16' backed by a backing plate 18' will be pushed by the other arm of the caliper 10 against the other surface of the rotor 20.

On such a conventional disc brake, a dust boot 22 made of a flexible material such as rubber has heretofore been mounted with one end attached to the cylinder 12 and the other end attached to the piston 14 to keep off dust from the cylinder bore. However, if a large braking energy is required because of very large vehicle load, the rotor would heat up and its heat be conducted through the brake pad 16, the backing plate 18 and the piston 14 to the dust boot 22, thus deteriorating it. The dust boot is subjected to more severe heat conditions at the piston side than at the cylinder side because the heat transferred by conduction is generally larger than that by radiation.

Preferred embodiments of this invention will be described with reference to FIGS. 2 to 8.

Referring to FIG. 2, a ring 24 made of a thermoinsulating material such as synthetic resin is fixedly mounted on the piston 14 at its outer end. A dust boot 22 has one end attached to the cylinder 12 and the other end attached to the ring 24.

As illustrated in FIGS. 3 to 5, the ring 24' may be secured to the outer end of the piston 14 so as to be disposed between the piston 14 and the backing plate 18 with the dust boot 22 attached in the same manner as in FIG. 2.

In any of the embodiments of FIGS. 2 to 5, the ring 24 (or 24') may be sealed against the piston 14, if desired, by means of an adhesive applied thereto, an O-ring 26 (as in FIG. 4), or a combination of an O-ring 26 and a threaded 28 (as in FIG. 5).

FIG. 6 illustrates another embodiment in which a plate 30 of a thermo-insulating material is interposed between the backing plate 18 and the piston 14 and the dust boot 22 is mounted in the same manner as in the prior art shown in FIG. 1.

Alternatively, the backing plate 18A itself may be made of a thermo-insultating material as illustrated in FIG. 7.

FIG. 8 illustrates a still another embodiment in which a cup 32 of a thermo-insulating material is fixedly mounted in the piston 14 with its bottom facing to the backing plate 18. In this embodiment, the dust boot 22 has one end attached to the cup 32 and the other end to the cylinder 12.

It will be understood from the foregoing that in accordance with this invention, a thermo-insulating member is interposed in the heat conduction path leading from the rotor through the brake pad, the backing plate and the piston to the dust boot to minimize the heat conduction from the rotor to the dust boot, thus retarding its aging or deterioration.

Although this invention has been described with reference to the floating caliper type disc brake by way of example, it is applicable to any other type of a disc brake including the opposed-piston type in which both brake pads are urged by their respective pistons. It is also applicable to a floating caliper type disc brake which includes two or more pistons at one side thereof for urging one of the brake pads.

While this invention has been described with reference to several preferred embodiments, it is to be understood that various changes or variations may be added without departing from the scope of the invention.

What is claimed is:

1. In a disc brake comprising a caliper, a pair of brake pads, a pair of backing plates, at least one piston carried by said caliper and slidably mounted in a cylinder for bringing one or both of said brake pads into engagement with the opposite surfaces of a rotor to be braked and dust guard means for keeping out dust from the cylinder bore, the improvement wherein there is provided a thermoinsulating member which is positioned between and in direct communication with said piston and dust guard means, to retard the deterioration of said dust guard means due to heat generated by operation of said brake.

2. The disc brake as claimed in claim 1 wherein a thermo-insulating member in the form of a ring is mounted around the periphery of said piston.

3. The disc brake as claimed in claim 1 wherein a thermo-insulating member in the form of a ring is mounted so as to be disposed between said piston and the one of said brake pads associated with said piston.

4. The disc brake as claimed in claim 1 wherein a thermo-insulating member in the form of a plate is mounted so as to be disposed between the piston and the one of the brake pads associated with said piston.

5. The disc brake as claimed in claim 1 wherein one of said backing plates is made of a thermo-insulating material.

6. The disc brake as claimed in claim 1 wherein a thermo-insulating member in the form of a cup is mounted in said piston so that its bottom faces the brake pad associated with the piston.

* * * * *